United States Patent [19]

Millard et al.

[11] Patent Number: 5,667,325

[45] Date of Patent: Sep. 16, 1997

[54] JOINT FOR STORABLE TUBULAR EXTENDIBLE MEMBER

[75] Inventors: Julian W. F. Millard, Toronto, Canada; Keith William Edwards, Solvang, Calif.; Howard J. Tucker, Oakville; Deepack Kaushal, Toronto, both of Canada

[73] Assignee: Spar Aerospace Limited, Brampton, Canada

[21] Appl. No.: 505,545

[22] Filed: Jul. 21, 1995

[51] Int. Cl.$^6$ ...................................... F16C 11/04
[52] U.S. Cl. ..................... 403/119; 403/81; 403/109; 242/390.3; 52/108; 182/41
[58] Field of Search .................. 403/119, 81, 24, 403/109, 377; 242/390.2, 390.3; 52/108; 74/521; 248/161; 182/40, 41

[56] References Cited

U.S. PATENT DOCUMENTS

| | | | |
|---|---|---|---|
| 3,144,104 | 8/1964 | Weir et al. | 182/41 X |
| 3,144,215 | 8/1964 | Kelin . | |
| 3,243,132 | 3/1966 | Taylor et al. | 242/390.3 |
| 3,364,632 | 1/1968 | Isaac | 242/390.3 X |
| 3,371,801 | 3/1968 | Widegren | 182/41 X |
| 3,434,674 | 3/1969 | Groskopfs | 242/390.2 |
| 3,589,632 | 6/1971 | Rew | 242/390.3 X |
| 3,608,844 | 9/1971 | Tumulty, Jr. et al. | 52/108 X |
| 3,863,405 | 2/1975 | Leiter | 52/108 |
| 3,868,961 | 3/1975 | Stemis | 74/521 X |
| 4,991,784 | 2/1991 | Schmid | 242/390.3 |
| 5,056,278 | 10/1991 | Atsukawa | 52/108 |

OTHER PUBLICATIONS

M.W. Thomson, "Deployable and Retractable Telescoping Tubular Structure Development", NASA Conference Publication 3260, 28th Aerospace Mechanisms Sypmposium, May 18–20, 1994.

*Primary Examiner*—Harry C. Kim

[57] ABSTRACT

A joint for a storable tubular extendible member comprises an input housing with sets of rollers which progressively deform the storable tubular extendible member from its tubular state to a tape-like flat state. An output housing includes rollers allowing the tape-like member to recover to its tubular state. A pivot joins the input and output housings and a plurality of confining members such as nip rollers are provided between the input and output housings to maintain the member in its flat state. The nip rollers are supported by link arms much that some of the rollers may pivot about a pivot on the input housing and others may pivot about a pivot on the output housing. A medial set of nip rollers is constrained to remain medially positioned between the input housing and output housing by having link arms extending from both the input housing pivot and the output housing pivot. A drive is provided to cause the joint to selectively bend. Telescoping cylinders extend from the output housing with the innermost cylinder frictionally engaging the storable tubular extendible member such that the telescoping cylinders act as a support for the storable tubular extendible member. Telescoping cylinders extend between a storage base for the storable tubular extendible member and the joint for supporting the joint and limiting the distance it may move away from the base.

20 Claims, 7 Drawing Sheets

1
JOINT FOR STORABLE TUBULAR EXTENDIBLE MEMBER

BACKGROUND OF THE INVENTION

1. Field of the Invention

The present invention relates to a joint for a storable tubular extendible member.

2. Description of the Related Art

It is known that if a flat strip of tempered spring steel, or other spring material, of much greater length than width, is elastically deformed into a tubular formation extending in the direction of its longitudinal axis, with substantial overlap of the longitudinal edges of the strip, then after a stress relieving heat treatment, the strip will recover to its tubular formation whenever free to do so. Consequently, the strip, if flattened to a tape-like state, may be tightly coiled at right angles to its longitudinal axis and will recover into its tubular formation as the tape-like strip is unrolled. Such a strip is known as a storable tubular extendible member, or STEM.

It is known to utilize two or more such tape-like strips which recover to form concentric tubes. The multi-tube configuration for a storable tubular extendible member provides a higher load bearing capability.

Storable tubular extendible members have found application in satellites as deployable antennae. However, these members would have broader application if they were jointed. The present invention therefore seeks to provide a joint for a storable tubular extendible member.

SUMMARY OF THE INVENTION

According to the present invention, there is provided a joint for a storable tubular extendable member, comprising, an input section comprising means for progressively deforming the storable tubular extendable member from a tubular state to a flat state at an output end, an output section comprising means for progressively allowing said storable tubular extendable member to recover from the flat state at an input end to the tubular state, a pivot joint between said input section output end and said output section input end pivotably joining said input section and said output section; a plurality of rollers extending between said input section output end and said output section input end for retaining said storable tubular extendable member in a flat state as said pivot joint pivots; and the drive for pivoting said pivot joint.

BRIEF DESCRIPTION OF THE DRAWINGS

In the drawings which illustrate example embodiments of the invention.

2

DETAILED DESCRIPTION OF THE PREFERRED EMBODIMENTS

The present invention is based on the principle that a storable tubular extendible member, when in its recovered tubular state, resists deflection from its longitudinal axle but, when in its flat tape-like state, may readily be bent in a direction perpendicular to the plane of a tape.

Figures 1, 1A:
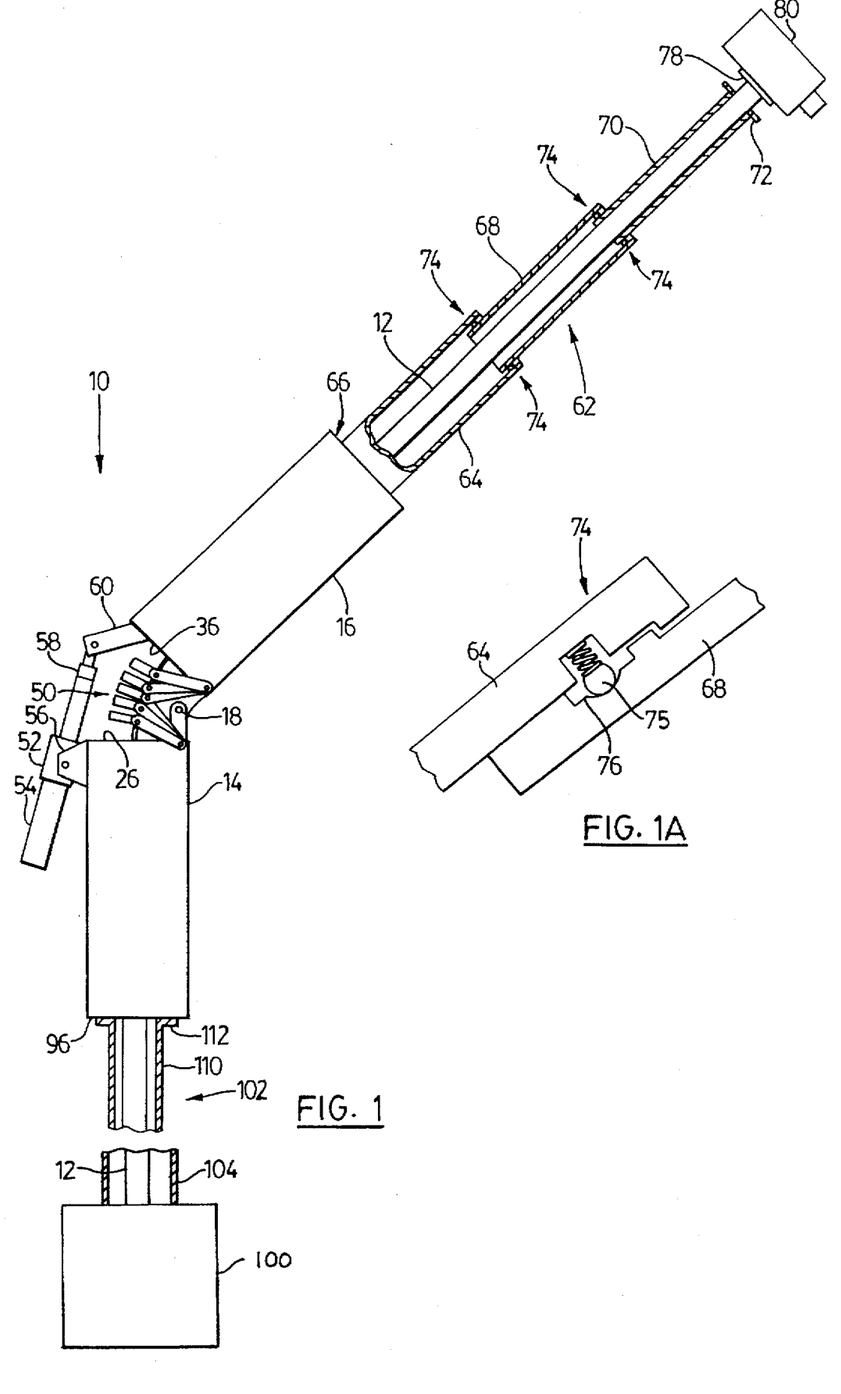
FIG. 1 is a side view of a storable tubular extendible member provided with a joint made in accordance with this invention.
FIG. 1A is an enlarged fragmentary view of a portion of FIG. 1.
Figure 4:
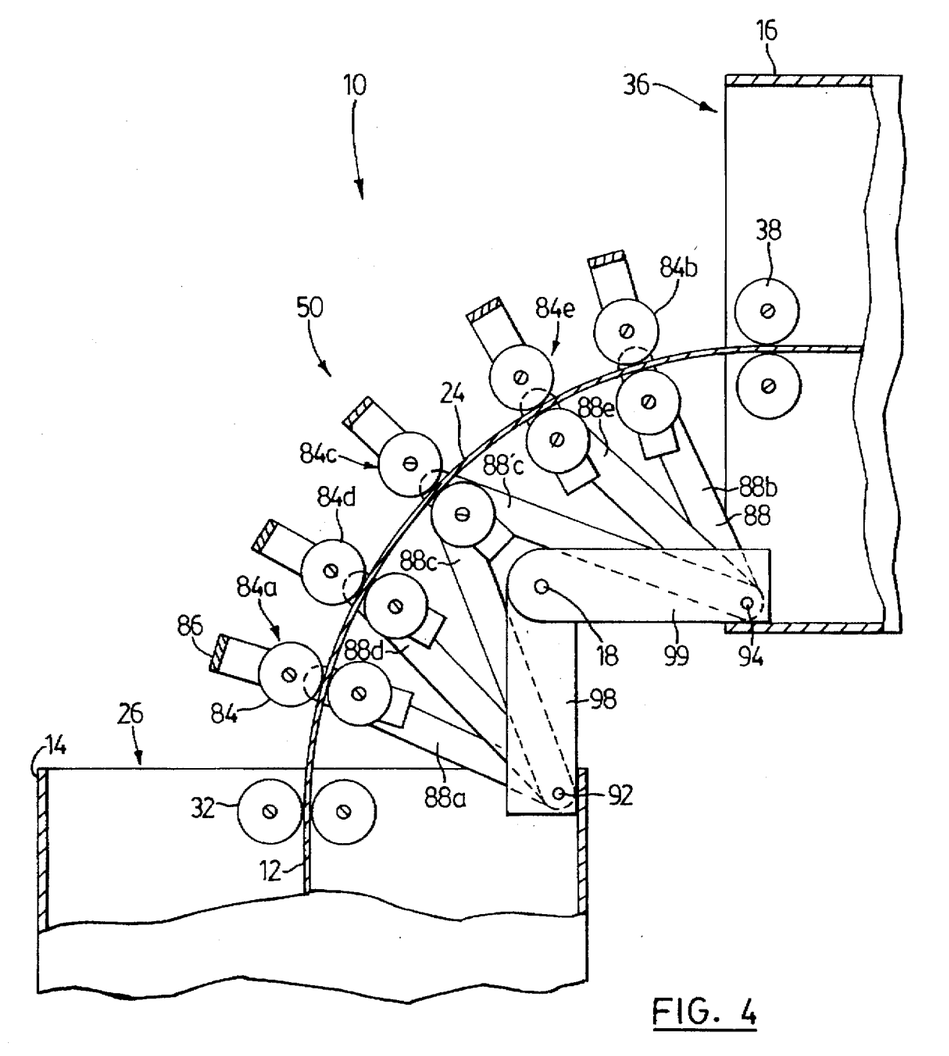
FIG. 4 is a cross-sectional view along the lines IV—IV of FIG. 3.

Turning to FIG. 1, a joint 10 for a storable tubular extendible member 12 comprises an input housing (section) 14, an output housing (section) 16, and a pivot joint 18 between the output end 26 of the input housing and the input end 36 of the output housing pivotably joining the input housing and the output housing. More particularly, as best seen in FIG. 4, the input housing has a tail 98 spaced from output nip rollers 32 of the input housing and extending toward the output housing and the output housing has a tail 99 spaced from the input nip rollers 38 of the output housing and extending toward said input housing. Pivot 18 joins these two tails.

Figure 2:
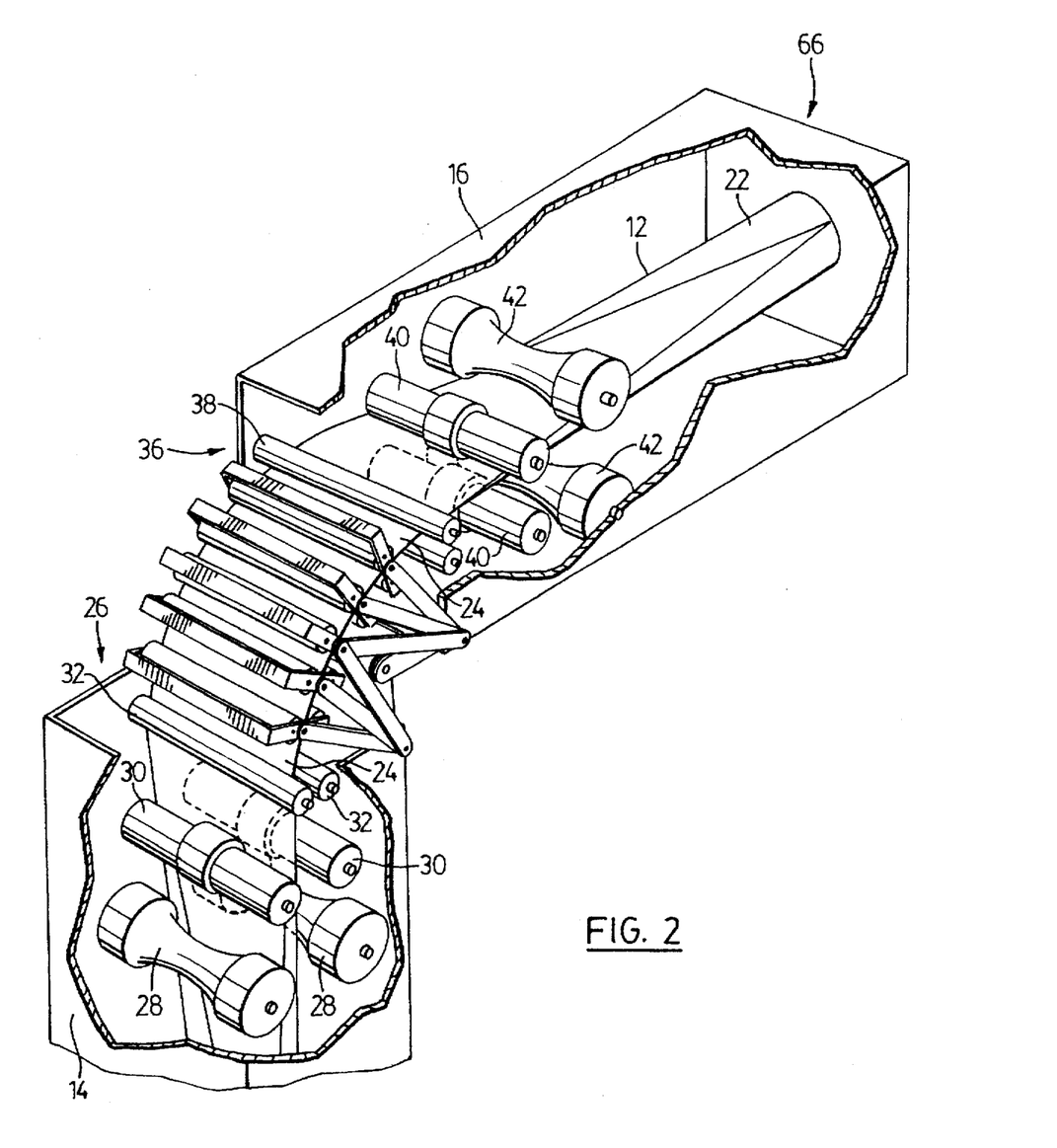
FIG. 2 is a cutaway perspective view of a portion of the joint of FIG. 1, shown in a different angular position.

Referencing FIG. 2, the input housing 14 has means for progressively deforming the storable tubular extendible member 12 from a tubular state to a flat tape-like state 24 at an output end 26. This progressive deforming means comprises a pair of apple-core rollers 28 followed by a pair of raised centre rollers 30 and, at output end 26, a pair of output nip rollers 32. The apple-core rollers apply pressure to the storable tubular extendible member, partially deforming same. The raised centres of the raised centre rollers 30 further deform the partially deformed storable tubular extendible member and the output nip rollers 32 complete the deformation of the storable tubular extendible member to its flat tape-like state 24.

The output housing 16 comprises means for progressively allowing the storable tubular extendible member to recover from its flat tape-like state 24 at an input end 36 to its tubular state 22 at an output end 66. These means comprise a pair of input nip rollers 38 at the input end 36 of the output housing 16, a pair of raised centre rollers 40, and a pair of apple-core rollers 42. Once the tape-like storable tubular extendible member passes through nip rollers 38, it is allowed by the raised centre rollers 40 partially to recover. It further recovers as it passes through the apple-core rollers 42 such that it regains its tubular state by the time it reaches the output end of the output housing.

Returning to FIG. 1, a plurality of confining members 50 extend between the input housing output end 26 and the output housing input end 36. As will be described in greater detail hereinafter, these confining members retain the storable tubular extendible member in a flat tape-like state as the pivot joint 18 pivots.

A linear actuator drive 54 is joined between the input housing and output housing remote from the axis of rotation of the pivot joint 18. More particularly, the base 52 of the linear actuator 54 is pivotably mounted to input housing 14 by trunnion mount 56. The extendible cylinder 58 of the linear actuator 54 is pivotably mounted to trunnion mount 60 extending from output housing 16.

Telescoping cylinders 62 extend from the output end 66 of the output housing. The telescoping cylinders comprise an outer cylinder 64 mounted at its inboard end to the output housing output end 66, a medial cylinder 68, and an inner cylinder 70 terminating in a radially directed flange 72 at its outboard end. Latches 74 are provided between the outboard end of the outer cylinder 64 and the inboard end of the medial cylinder 68 for latching the medial cylinder in an extended position. With reference to FIG. 1a, each latch 74 comprises has a spring loaded ball 75 supported proximate the outboard end of outer cylinder 64 and a detent 76 proximate the inboard end of medial cylinder 68 into which the spring loaded ball 75 may snap. The outboard end of the medial cylinder 68 and the inboard end of the inner cylinder 70 have a similar set of latches 74. The inner cylinder 70 16 sized for a sliding frictional engagement with the storable tubular extendible member so that the telescoping cylinders 62 support a portion of the storable tubular extendible member 12.

The storable tubular extendible member 12 terminates in a flange 78 which acts as a mounting plate for an instrument, such as camera 80.

The storable tubular extendible member 12 is deployed from a storage base 100. A variety of storage bases are known to those skilled in the art. These bases generally comprise a storage reel holding a coiled storable tubular extendible member, a drive to turn the reel, and means to uncoil the member from the turning reel such that the uncoiling member controllably recovers to its tubular state. Since suitable deploying bases are known to those skilled in the art, they are not further detailed, except to note that an example deploying base is disclosed in U.S. Pat. No. 3,144,215, and the disclosure of this patent is incorporated herein by reference.

Telescoping cylinders 102 extend between the base 100 and the joint 10. The telescoping cylinders comprise an outer cylinder 104 mounted at its inboard end to the base 100, a number of medial cylinders (not shown), and an inner cylinder 110 terminating at its outboard end in a radially directed flange 112 Joined to the input housing 14 input end 96. The telescoping cylinders 102 have the same detent latches between cylinders as are present in telescoping cylinders 62 such that cylinders 102 latch in their extended position. Because the telescoping cylinders 102 are joined to both the base 100 and joint 10, they support the portion of the storable tubular extendible member 12 extending between the base and joint and limit the distance that the joint may move away from the base.

The detent latches of telescoping cylinders 102 and telescoping cylinders 62 are configured such that the strongest latch is between the outer cylinder 104 extending from base 100 and its next adjacent cylinder and the latches progressively weaken, with the weakest latch being between the inner cylinder 70 and medial cylinder 68.

Figure 3:
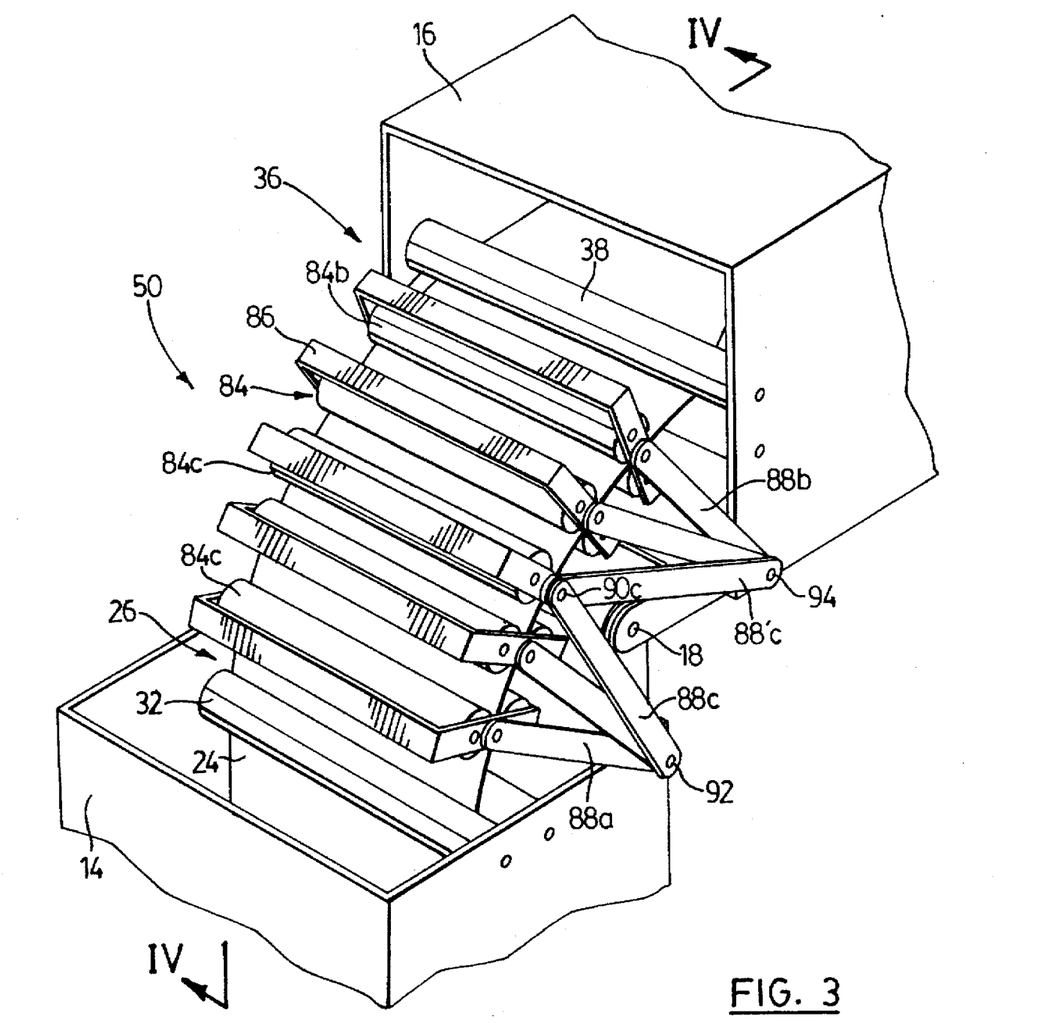
FIG. 3 is an enlarged perspective view of a portion of the joint of FIG. 2.
Figure 5:
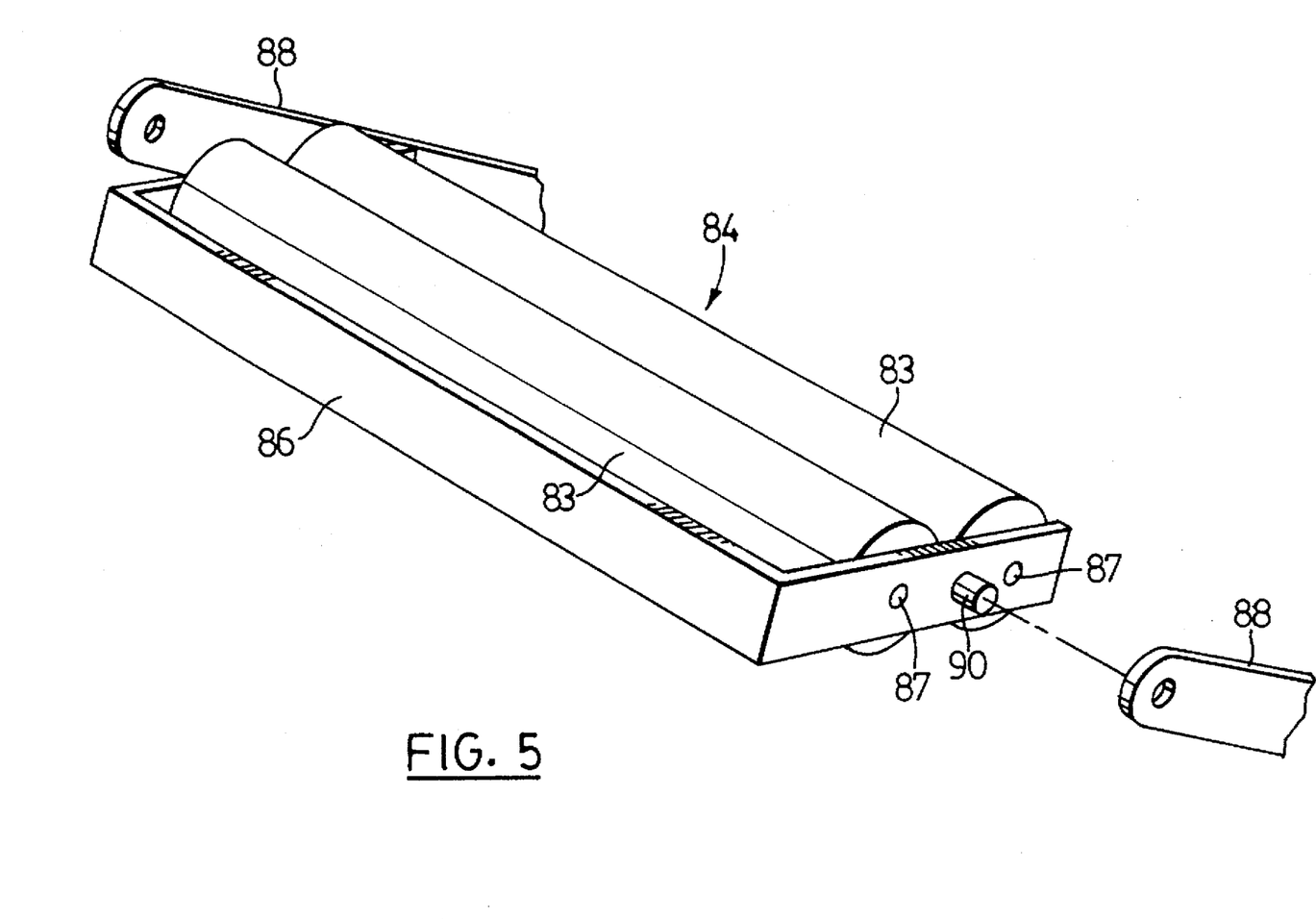
FIG. 5 is a perspective partially exploded view of a portion of FIG. 3.

Turning to FIGS. 3 and 4, the plurality of confining members 50 comprise a plurality of sets 84 of nip rollers. Referencing FIG. 5, the nip rollers 83 of each set 84 are rotationally mounted in a housing 86 by pivots 87 and a link am 88 is pivotably mounted to either side of the housing 86 by a pin 90. More particularly, and returning to FIGS. 3 and 4, a first pair 88a of link arms is pivotably joined to a first set 84a of nip rollers which set is in relative proximity to the input housing output end 26. This first pair of link arms is also pivotably joined to the input housing 14 at an input housing pivot 92 spaced from, but proximate to, the pivot joint 18. A second pair 88b of link arms is pivotably joined to the output housing 16 at an output housing pivot 94 spaced from, but proximate to, the pivot joint 18. The second pair 88b of link arms is pivotably joined to a second set 84b of nip rollers, this second set 84b being in relative proximity to the output housing input end 36. A third pair 88c of link arms is pivotably joined to the input housing pivot 92 and a fourth pair 88'c of link arms is pivotably joined to the output housing pivot 94. The third 88c and fourth 88'c pair of link arms are joined at common pivots 90c to a third set 84c of nip rollers, which is disposed medially between the input housing output end 26 and the output housing input end 36 and, therefore, between the first set 84a and second set 84b of nip rollers. A fifth pair 88d of link arms is pivotably joined to the input housing pivot 92 and pivotably joined to a fourth set 84d of nip rollers, which set is disposed between set 84a and medial set 84c. Finally, a sixth pair 88e of link arms is pivotably joined to the output housing pivot 94 and pivotably joined to a fifth set 84e of nip rollers, which set is disposed between the second set 84b and a medial set 84c.

Figure 6:
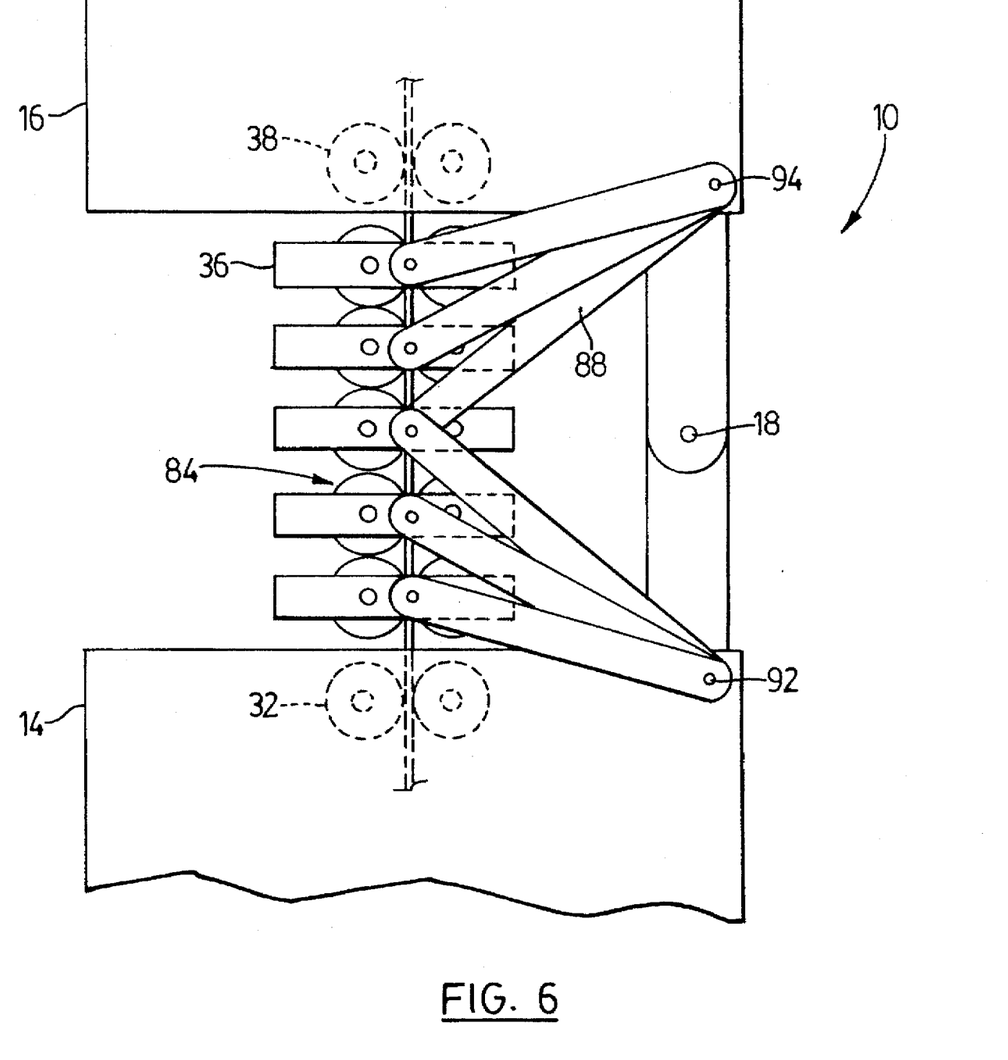
FIG. 6 is a schematic side view of a portion of the joint of FIG. 1 shown in a different angular position.

In operation, linear actuator 54 (FIG. 1) my be activated to move joint 10 from an in-line configuration, illustrated in FIG. 6, to an angulated configuration, as shown in FIG. 4. In such case, link arm pelts 88c and 88'c will maintain the medial nip roller set 84c in a position mid-way between the input housing output end 26 and the output housing input end 36. On the other hand, the retaining nip roller sets are free to float about their respective pivots 92, 94. However, pivoting the joint away from an in-line configuration moves pivots 92 and 94 behind pivot joint 18. This, in combination with the constraint imposed by the tubular extendible member 12 which extends between the nip roller sets, will force the floating nip roller sets to move away from the medial nip roller set 84c. The result is that the nip roller sets maintain a relatively uniform spacing between the output end 26 of the input housing and the output housing input end 36 as the angle of joint 10 changes. The uniformly spaced rollers 50 (i) maintain the storable tubular extendible member 12 in its tape-like state 24 between nip rollers 32 anti 38 and (ii) tightly control the path of the tape-like member between the housings. Because the storable tubular extendible member 12 is maintained in its tape-like state, the member 12 does not resist joint angle changes. When in a tape-like state, the storable tubular extendible member is extremely susceptible to buckling or folding, however, because rollers 50 tightly control the path of tape-like member 12, the risk of this occurring is negligible.

Referring to FIG. 1, the storable tubular extendible member 12 my be extended by uncoiling additional tape from base 100. As member 12 is extended, joint 10 will move away from the deploying base to the extent the member is extended until the telescoping cylinders 102 latch into their fully extended position. Thereafter, joint 10 is restrained from moving further away from the bass, so with further extension, the storable tubular extendible member 12 will slide through joint 10. In so doing, the sliding member will be deformed into tape-like state 24 through nip rollers 84a through 84e and will recover to 1is tubular state 22 at the output end 66 of the output housing 16. Clearly the joint angle may be changed even while the storable tubular extendible member 12 is sliding through joint 10.

With joint 10 restrained from moving away from the base, as the storable tubular extendible member slides through the joint 10, the sliding frictional engagement between member 12 and the inner cylinder 70 of telescoping cylinders 62 will cause the inner cylinder to extend with the tubular extendible member 12. When the inner cylinder 70 reaches its fully extended position, the spring loaded balls 75 of the medial cylinder snap into the detents 76 of the inner cylinder, latching it in this extended position. Thereafter, the medial cylinder will move with the innermost cylinder if the tubular extendible member continues to be extended. Once the medial cylinder reaches its full extension, the balls 75 of the outer cylinder snap into detents 76 In the medial cylinder, latching the medial cylinder in its extended position. Further extension of the storable tubular extendible member 12 will then result in the tubular extendible member 12 sliding within the now fully extended telescoping cylinders 62.

If the storable tubular extendible member is retracted, the detent latches of the telescoping cylinders 62 and 102 are designed to have sufficient strength to retain these telescoping cylinders in their fully extended positions while the member 12 slides through telescoping cylinder 70 and the joint 10. However, once flange 78 of the storable tubular extendible member impacts flange 72 of the telescoping cylinder 70, further retraction of the storable tubular extendible member will sequentially displace the detent latches of cylinders 62 and then cylinders 102 such that the telescoping cylinders begin to collapse with further retraction of the storable tubular extendible member. This arrangement therefore provides extendible supports for the storable tubular extendible member.

Camera 80 and linear actuator 54 may be operated remotely through the use of electromagnetic waves.

When the storable tubular extendible member slides through the joint 10, there will be an urging force on the floating nip roller sets 84a, 84b, 84d, and 84e. However, the arc subtended by the storable tubular extendible member 12 through these floating nip rollers, and the constraint imposed on the floating nip rollers by pivots 92 and 94, will ensure that the floating nip roller sets remain spaced along the path of the storable tubular extendible member between the input housing output end 26 and the output housing input end 36. Nevertheless, in some instances, it may be preferable to provide springs between each set of nip rollers 84a through 84e to help ensure their uniform spacing along the path of the storable tubular extendible member between these nip rollers.

Figure 7:
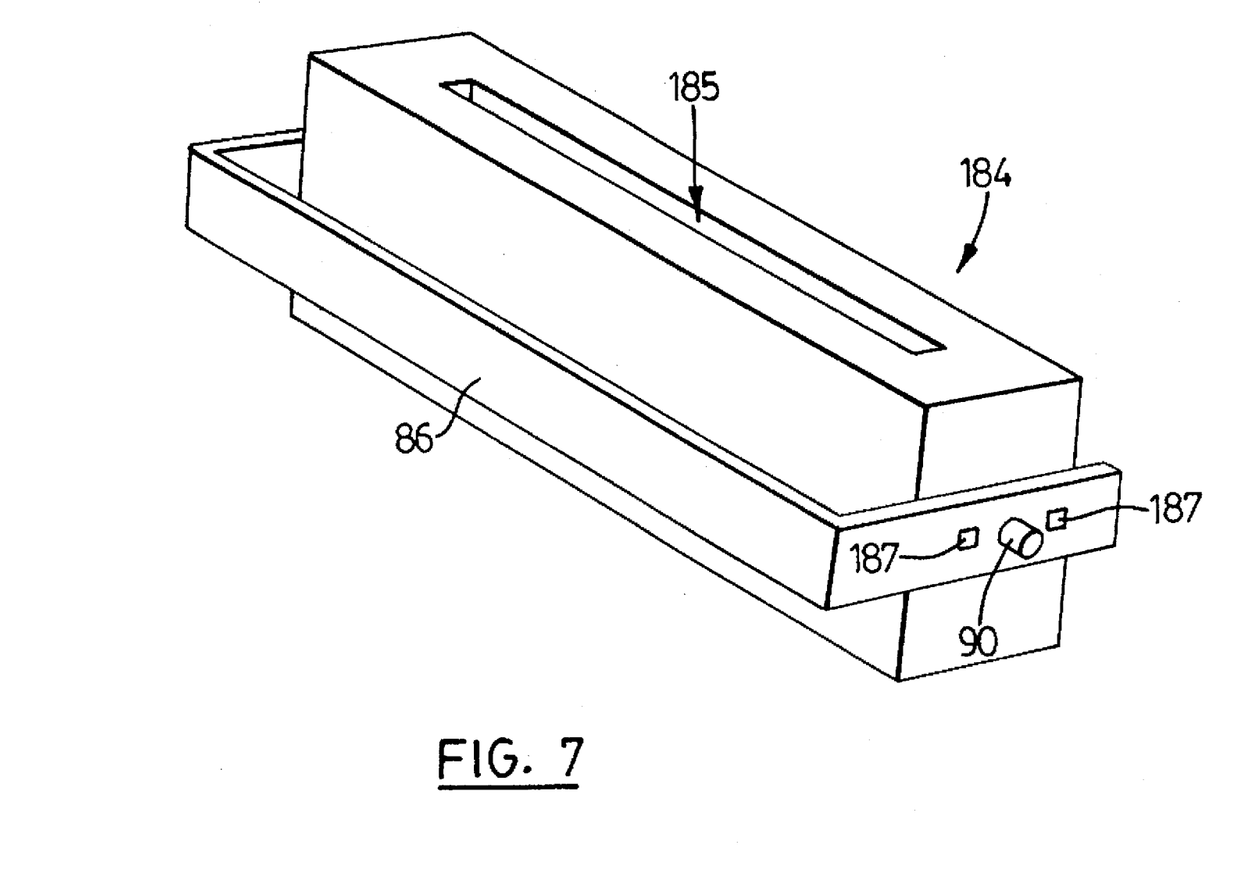
FIG. 7 is a perspective view of a portion of a joint made in accordance with another aspect of this invention.

In an alternate form of this invention, each confining member, rather than being a set of nip rollers 84, may be a member having a low friction slot. This alternative is illustrated in FIG. 7, wherein like parts have been given like reference numerals. Slotted member 184 is mounted to housing 86 by square pins 187. As before, the housing 86 has pins 90 for reception of link arms. The slotted member is provided with a slot 185 sized for confining the storable tubular extendable member in its flat tape-like state and having low friction walls such that the storable tubular extendable member may readily slide within the slot.

The joint 10 of this invention may be used with any number of strips used in forming a storable tubular extendible member.

While the joint 10 has been described in conjunction with five confining members 58 between the input housing output end 26 and the output housing input end, it will be apparent that other numbers of confining members could be employed, such as three or seven. In this regard, while it is preferable to have a medial confining member, two side-by-side confining members supported such that they maintain a medial position between the input housing output end 26 and the output housing input end 36 would also function.

An hydraulic cylinder or other type of joint actuator could be used in place of the linear actuator 54.

The ball detent latches between the cylinders of telescoping cylinders 62 and 102 may be replaced with pin latches, or other type of latches.

If the joint 10 is to remain a fixed distance from base 100, the telescoping cylinders 102 my be replaced with a rigid tube joined to the base and to the input end 96 of the input housing 14.

In some applications, it may be preferred to have joint 10 maintain a filed position with respect to the instrument at the end of the storable tubular extendible member. In such case, telescoping cylinders 102 may be omitted, or may be replaced by a large diameter storable tubular extendable member which envelopes the storable tubular extendable member 12 and is joined to the input end 96 of input housing 14, so that there is no restraint on the joint 10 moving away from the base 100.

For certain applications, supporting telescoping cylinders 62 say be unnecessary.

The rollers in output housing 16 for progressively allowing the storable tubular extendible member to recover from its flat tape-like state to its tubular state could be replaced by any other means known to those skilled in the art deploying a storable tubular extendable member, such as the means described in aforementioned U.S. Pat. No. 3,144,215. As would be apparent to those skilled in the art, many of these means could also be applied in reverse to progressively deform the storable tubular extendible member 12 from a tubular state to a flat tape-like state.

Other modifications will be apparent to those skilled in the art and, therefore, the invention is defined in the claims.

A storable tubular extendible member provided with a joint 10 and a camera 80 of FIG. 1 has particular utility in allowing the examination of the interior of large storage tanks. Such an arrangement is advantageous in inspecting nuclear waste storage tanks since the access holes to such tanks are arranged so they do not point toward the nuclear source to limit the "shine" of radiation through the hole. The jointed storable tubular extendible member of this Invention could pass through such an access hole and then bend In order to perform necessary functions.

We claim:

1. A joint for a storable tubular extendable member, comprising:

an input section comprising means for progressively deforming said storable tubular extendable member from a tubular state to a flat state at an output end;

an output section comprising means for progressively allowing said storable tubular extendable member to recover from said flat state at an input end to said tubular state;

a pivot joint between said input section output end and said output section input end pivotally joining said input section and said output section;

a plurality of rollers extending between said input section output end and said output section input end for retaining said storable tubular extendable member in said flat state as said pivot joint pivots; and a drive for pivoting said pivot joint.

2. The joint of claim 1 wherein said plurality of rollers comprises a plurality of sets of nip rollers.

3. The joint of claim 2 wherein said input section means for progressively deforming said storable tubular extendable member from said tubular state to said flat state comprises a series of rollers and wherein said output section means for progressively allowing said storable tubular extendable member to recover from said flat state to said tubular state comprises a series of rollers.

4. The joint of claim 3 comprising, for each set of said plurality of sets of nip rollers, a link arm pivotably joined to said each set and pivotably joined to one of said input section and said output section.

5. The joint of claim 3 comprising, a first link arm pivotably joined to said input section at a first pivot spaced from, but proximate to, said pivot joint, said first link arm pivotably joined to a first set of said plurality of sets of nip rollers, said first set being in relative proximity to said input section output end;

a second link arm pivotably joined to said output section at a second pivot spaced from, but proximate to, said pivot joint, said second link arm pivotably joined to a second set of said plurality of sets of nip rollers, said second set being in relative proximity to said output section input end;

a third link arm pivotably joined to said input section at said first pivot;

a fourth link arm pivotably joined to said output section at said second pivots;

said third link arm and said fourth link arm joined at a common pivot to a third set of said plurality of sets of nip rollers which is disposed between said first set and said second set.

6. The joint of claim 5 comprising:

fifth link arm pivotally joined to said input section at said first pivot and pivotally joined to a fourth set of said plurality of sets of nip rollers which is disposed between said first set and said third set; and a sixth link arm pivotally joined to said output section at said second pivot and pivotally joined to a fifth set of said plurality of sets of nip rollers which is disposed between said second set and said third set.

7. The joint of claim 6 wherein said drive comprises a linearly extendable member joined between said input section and said output section remote from an axis of rotation of said pivot joint.

8. The joint of claim 7 wherein said input section series rollers comprises a pair of apple-core rollers, a medial pair of raised centre rollers, and a pair of nip rollers at said input section output end.

9. The joint of claim 8 wherein said output section series of rollers comprises a pair of nip rollers at said output section input end, a medial pair of raised centre rollers, and a pair of apple-core rollers.

10. The joint of claim 1 including telescoping cylinders extending from an output end of said output section and surrounding said storable tubular extendable member, an innermost cylinder of said telescoping cylinders slidably engaging said storable tubular extendable member.

11. The joint of claim 6 including telescoping cylinders extending from an output end of said output section and surrounding said storable tubular extendable member, an innermost cylinder of said telescoping cylinders sized for frictional sliding engagement with said storable tubular extendable member.

12. The joint of claim 11 wherein said telescoping cylinders have latch means for latching in an extended position.

13. The joint of claim 12 including further telescoping cylinders extending between a storage base for said storable tubular extendible member and an input end of said input section for limiting the distance which said input section may move from said base.

14. The joint of claim 13 wherein said further telescoping cylinders surround said storable tubular extendible member.

15. The joint of claim 14 wherein said drive comprises a linear actuator.

16. A joint for a storable tubular extendable member, comprising:

an input housing having a series of rollers for progressively flattening said storable tubular extendable member into a tape-like state at an output;

an output housing having a series of rollers for progressively allowing said storable tubular extendable member to recover from said tape-like state at an input to a tubular state;

said input housing having a tail spaced from said output of said input housing and extending toward said output housing and said output housing having a tail spaced from said input of said output housing and extending toward said input housing;

a tail pivot pivotally joining said input housing tail to said output housing tail;

a plurality of sets of nip rollers disposed between said input housing output and said output housing input for supporting said storable tubular extendable member in said tape-like state while said tail pivot pivots; and a drive for pivoting said tail pivot.

17. The joint of claim 16 comprising, a first link arm pivotably joined to said input housing at a first pivot proximate said tail pivot and pivotably joined to a set of said plurality of sets of nip rollers which set is most proximate said input housings and a second link are pivotably joined to said output housing at a second pivot proximate said tail pivot and pivotably joined to a set of said plurality of sets of nip rollers which is most proximate said output housing.

18. The joint of claim 17 comprising:

a third link arm pivotally joined to said first pivot;

a fourth link arm pivotally joined to said second pivot;

a third link arm and said fourth link arm joined at a common pivot to a medial set of said plurality of sets of nip rollers.

19. The joint of claim 17 wherein said first pivot is positioned adjacent said input housing tail and wherein said second pivot is positioned adjacent said output housing tail.

20. The joint of claim 16 including telescoping cylinders extending between a storage base for said storable tubular extendible member and an input end of said input housing for limiting the distance which said input housing may move from said base.

* * * * *

UNITED STATES PATENT AND TRADEMARK OFFICE
CERTIFICATE OF CORRECTION

PATENT NO. : 5,667,325
DATED : September 16, 1997
INVENTOR(S) : Julian W. F. MILLARD et al.

It is certified that error appears in the above-identified patent and that said Letters Patent is hereby corrected as shown below:

Claim 5, column 6, line 65, delete "." and insert --;--;

Claim 6, column 7, line 20, insert --a-- before "fifth";

Claim 8, column 7, line 32, insert --of-- between "series" and "rollers";

Claim 17, column 8, line 36, delete "are" and insert --arm--; and

Claim 18, column 8, line 43, delete "a" (first instance) and insert --said--.

Signed and Sealed this

Sixteenth Day of December, 1997

Attest:

BRUCE LEHMAN

Attesting Officer

Commissioner of Patents and Trademarks